(12) United States Patent
Katagiri et al.

(10) Patent No.: US 7,050,723 B2
(45) Date of Patent: May 23, 2006

(54) LASER OSCILLATOR, OPTICAL COMMUNICATION METHOD AND SYSTEM

(75) Inventors: Yoshitada Katagiri, Tokyo (JP); Etsu Hashimoto, Tokyo (JP); Kenichi Suzuki, Narashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 489 days.

(21) Appl. No.: 10/047,008

(22) Filed: Jan. 14, 2002

(65) Prior Publication Data

US 2004/0196876 A1 Oct. 7, 2004

(30) Foreign Application Priority Data

Jan. 19, 2001 (JP) .............................. 2001-011545

(51) Int. Cl.
*H04B 10/00* (2006.01)
(52) U.S. Cl. ........................ 398/195; 398/200; 398/197
(58) Field of Classification Search ........ 398/182–201, 398/140, 153; 372/94
See application file for complete search history.

(56) References Cited

U.S. PATENT DOCUMENTS

| | | |
|---|---|---|
| 5,206,920 A | 4/1993 | Cremer et al. |
| 5,524,118 A * | 6/1996 | Kim et al. ..................... 372/6 |
| 6,018,582 A | 1/2000 | Francois et al. .............. 380/49 |
| 6,215,567 B1 | 4/2001 | Tochi |
| 6,430,336 B1 * | 8/2002 | Frankel ....................... 385/24 |

FOREIGN PATENT DOCUMENTS

| | | |
|---|---|---|
| EP | 0 571 132 A1 | 11/1993 |
| EP | 1 079 552 A2 | 2/2001 |

(Continued)

OTHER PUBLICATIONS

Strzelecka, E.M., et al., "Monolithic Integration of an Array of Multiple-Wavelength Vertical-Cavity Lasers with a Refractive Microlens for Optical Interconnections", Lasers and Electro-Optics Society Annual Meeting, 1996, p. 271.
Japanese Office Action for JP 2002-010627 mailed on Nov. 1, 2005.

(Continued)

*Primary Examiner*—Agustin Bello
(74) *Attorney, Agent, or Firm*—Darby & Darby

(57) ABSTRACT

Extremely advanced technology for scrambling an optical signal based on quantum mechanical fluctuation is used to provide a highly reliable optical communication method which can invalidate illicit activities such as wire-tapping, a system, and a laser oscillator which is used in the method and system. A transmitter side generates laser light, simultaneously oscillated at a plurality of wavelengths, the total number of generated photons being constant, and transmits a signal light comprising data which has been added to the light of the plurality of wavelengths; and at a receiving side, light, simultaneously oscillated at the plurality of wavelengths, is selected from the signal light, and the data is demodulated.

19 Claims, 13 Drawing Sheets

FOREIGN PATENT DOCUMENTS

| | | |
|---|---|---|
| JP | 04-344601 A | 12/1992 |
| JP | 5-075194 | 3/1993 |
| JP | 06-077935 A | 3/1994 |
| JP | 8-167873 | 6/1996 |
| JP | 9-247086 | 9/1997 |
| JP | 11-088297 A | 3/1999 |
| JP | 2001-177521 | 6/2001 |

OTHER PUBLICATIONS

Yoshitada Katagiri and Ken-ichi Suzuki, "Lightwave Generation based on Photon-number Squeezing in an Optical Loop and its Applications", Technical Report on IEICE, OCS99-67, pp. 19-24, Oct. 1999.

* cited by examiner

LASER OSCILLATOR, OPTICAL COMMUNICATION METHOD AND SYSTEM

BACKGROUND OF THE INVENTION

1. Field of the Invention

The present invention relates to a laser oscillator and an optical communication method and system. The invention specifically relates to technology for scrambling optical signals, which can be used in a highly reliable optical communication system which invalidates illicit activities such as wire-tapping.

2. Description of the Related Art

In an optical communication system using optical fiber as a transmission medium, the communication can be tapped in the same manner as electrical communications using electrical wires by locally bending the optical fiber so that the mode of transmitting along the optical fiber is easily converted to an radiation mode, thereby enabling the light which is being transmitted in the optical fiber to be extracted to the outside. Furthermore, a communication system using spatial light propagation can easily be tapped by providing an optical receiver in the same manner as radio communications.

When the tapped signal can be demodulated, even in a case where the data has been enciphered, the possibility remains that the data can be theoretically deciphered.

For this reason, a desirable communication method is one in which it is difficult to demodulate a tapped signal. One conventional proposal for such a communication method utilizes quantum-mechanical fluctuations which cannot be artificially reproduced, such as the irregularity (chaotic nature) of a laser oscillator.

For example, in one communication method, laser light having chaotic fluctuation is used as the carrier, which data is added to and transmitted, and a part of the signal light transmitted is input a laser resonator on the receiving side so that the laser resonator can perform synchronous oscillation, whereby the carrier component is extracted and the data is subsequently demodulated. According to this method, without the aforementioned special means for extracting the carrier component, a signal detected by a conventional communication method for directly detecting ordinary signal light would always be distorted, making it impossible to demodulate the data.

When extracting the carrier component by inputting signal light to a laser resonator and performing synchronous oscillation, the light carrier frequency and the oscillating frequency of the laser resonator must be aligned with high precision. However, the optical frequency of infrared light used in optical communication is approximately 190 THz, which is much higher than the frequency of ordinary electrical and microwave communications (several GHz). Consequently, a large amount of change in the oscillating frequency is caused by fluctuation of the laser resonator (e.g. thermal and mechanical fluctuation of the resonator length). Since fluctuation reflects changes in the physical properties of the laser resonator, such as change in the refractive index, it has a wide band of components.

In attempting to inject laser light into another laser resonator and perform synchronous oscillation, the resonant frequency of the laser resonator must be aligned with great precision to the light frequency of the injected light.

However, the laser resonator attempting the synchronous oscillation has fluctuation in its own oscillating frequency similar to that of the other laser resonator. As a result, it is impossible to guarantee that the resonant frequency of the laser resonator attempting the synchronous oscillation will remain within the frequency bandwidth of the other laser resonator for a long period of time.

Furthermore, when the person performing the tapping has means for demodulating the signal obtained by synchronous oscillation as described above, conventional methods offer no physical means of stopping him from demodulating the tapped signal.

SUMMARY OF THE INVENTION

The present invention has been realized in consideration of the above matters. It is an object of this invention to increase the reliability of an optical communication system by providing an extremely advanced technique for scrambling an optical signal based on quantum mechanical fluctuation, thereby invalidating illicit activities such as wire-tapping.

The optical communication method of the present invention comprises the following steps: at a transmitting side, generating laser light, simultaneously oscillated at a plurality of wavelengths, the total number of generated photons being constant, and transmitting a signal light comprising identical data which has been added to the light of the plurality of wavelengths; and at a receiving side, selecting light, simultaneously oscillated at the plurality of wavelengths, from the signal light, and demodulating the data.

Further, the laser oscillator of this invention outputs laser light oscillated simultaneously at a plurality of wavelengths, the total number of generated photons being constant.

A transmitter of this invention comprises a plurality of laser oscillators which output laser light oscillated simultaneously at a plurality of wavelengths, the total number of generated photons being constant; a plurality of optical modulators which add identical data to the laser light, output by the plurality of laser oscillators, and output optical signals; and a coupler which multiplexes the plurality of optical signals, output by the plurality of optical modulators, and transmits a wavelength-multiplexed signal.

A receiver of this invention comprises selectors which receive wavelength-multiplexed optical signals from a transmission path, the optical signals being transmitted by adding identical data to a plurality of laser lights oscillating simultaneously at a plurality of wavelengths, the total number of generated photons being constant, and select combinations of a plurality of simultaneously oscillated wavelength components from the wavelength components contained in the optical signals; a coupler which multiplexes light of the selected combinations of a plurality of simultaneously oscillated wavelength components; and demodulators which demodulate data by directly detecting the multiplexed light.

An optical communication system of this invention comprises a transmitter which generates laser light by using a laser resonator, which generates photons by stimulated emission centering on a plurality of windows, provided on a wavelength axis, the transmitter comprising an optical negative feedback element for keeping the total number of generated photons constant, and using an optical modulator to add data to the laser light and transmit a signal light; a transmission path which the signal light, transmitted from the transmitter, is transmitted along; and a receiver which receives the signal light from the transmission path, and demodulates the data based on an optical signal having wavelength components corresponding to the plurality of windows contained in the signal light.

This invention uses quantum fluctuation to separate a signal light into two or more noises, which are difficult to reproduce by artificial methods. Consequently, when receiving only one wavelength, it is only possible to detect chaotic noise components. Therefore, data demodulation by tapping can be almost completely prevented. Furthermore, after one signal light has been separated into multiple wavelength components, these are transmitted along different paths, and consequently, the possibility of demodulating the data by tapping is also made completely physically impossible, whereby a communication services which are extremely reliable can be provided.

DETAILED DESCRIPTION OF THE PREFERRED EMBODIMENTS

Embodiments of the present invention will be explained in detail using the drawings. The explanations of each of the following embodiments take as an example a case where two wavelengths are simultaneously laser-oscillated, but the invention can similarly be applied in cases where three or more wavelengths are simultaneously laser-oscillated.

Firstly, the basic principles of the embodiments of the invention will be explained with reference to FIGS. 5 and 6. It is possible to explain the properties of laser light (laser light oscillated simultaneously at multiple wavelengths) in single peak modes that oscillates simultaneously at different wavelengths by means of photon statistics.

Figure 5:
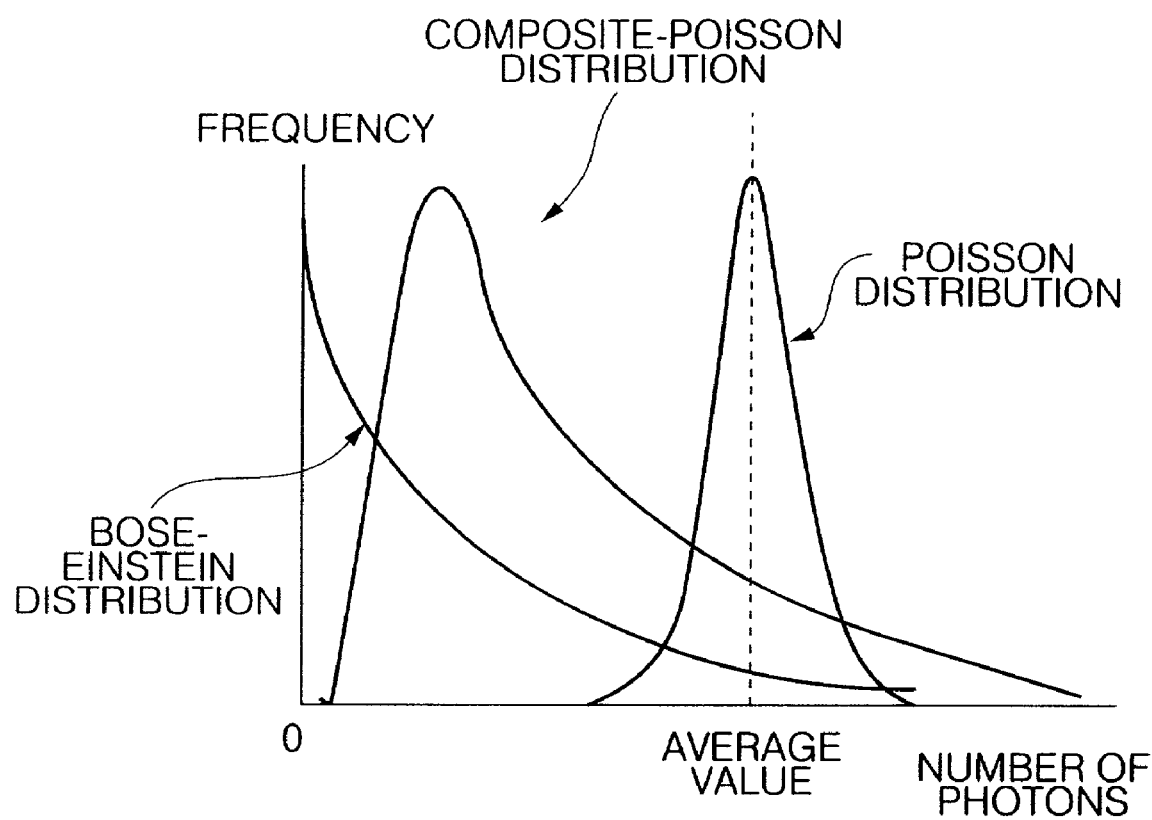
FIG. 5 is a diagram using photon statistics to show properties of laser light in single peak mode oscillating simultaneously at different wavelengths.

Photon statistics are statistics relating to the frequency of numbers of photons, counted by an observation system which counts the photons in a finite time slot T (see FIG. 6), and, as shown in FIG. 5, a sine wave electromagnetic wave which is coherent light has theoretically Poisson distribution. The fact that the photon statistics of the wave have Poisson distribution signifies that the total number and flow quantity (corresponding to the strength of the laser light) of the generated photons is constant. On the other hand, chaotic light such as white light has Bose-Einstein distribution. In Bose-Einstein distribution, the smaller the statistical count value, the higher the frequency of the number of photons, and there is a high probability that photons will not be observed. Bose-Einstein distribution is similar to the distribution of spontaneous emission light, which is one type of thermal distribution. On the other hand, photon statistics of imperfect chaotic light have a composite Poisson distribution which is midway between Poisson distribution and Bose-Einstein distribution.

Figure 6:
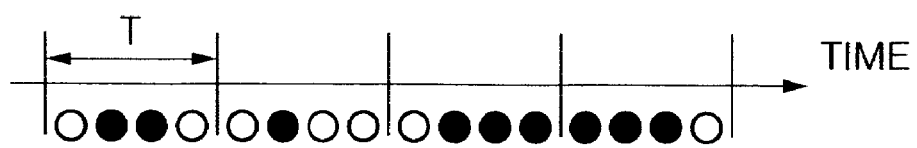
FIG. 6 is a diagram using photon statistics to show properties of laser light in single peak mode oscillating simultaneously at different wavelengths.

As shown in FIG. 6, laser light oscillated simultaneously at two wavelengths generates a stable photon train in the same manner as an ordinary single-mode laser, and consequently, when the photon wavelengths (separated into white and black) are regarded carelessly, its photon statistics comply with Poisson distribution in the same manner as a conventional single-mode laser. However, when photon statistics are taken for each wavelength, the question of which wavelength the laser oscillator is generating photons at is completely (or almost completely) quantum mechanically confused, and consequently, the distribution of light of each wavelength complies with photon statistics of Bose-Einstein distribution (or composite Poisson distribution) corresponding to chaotic light.

Therefore, as described above, by using an optical filter to multiplex and demultiplex laser light, generated by a laser oscillator which oscillates light simultaneously at two wavelengths, the distribution can easily be shifted from a stable state to a disordered state, and vice versa.

In the embodiments of the present invention, these ordered and disordered states of the light are used in quantum-mechanical scrambling of optical signals. Data is modulated and demodulated in the ordered state, and optical signals are transmitted in the disordered state. Therefore, an optical signal which has been tapped during transmission will be in a state of quantum-mechanical disorder, making it impossible to demodulate the data by any artificial method.

EMBODIMENT 1

Figure 1:
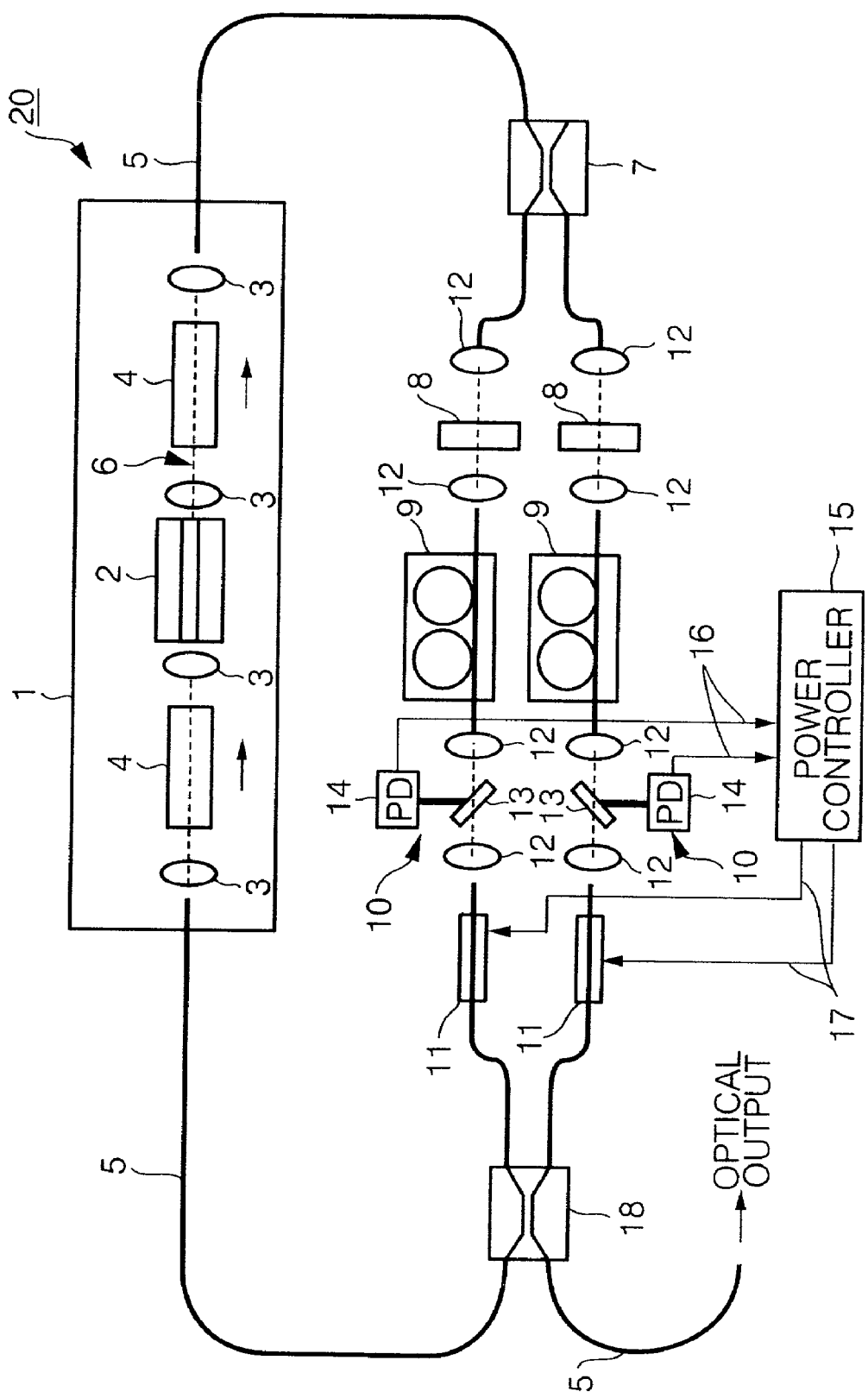
FIG. 1 is a block diagram showing the constitution of a laser oscillator according to a first embodiment of the present invention.

FIG. 1 shows the constitution of a laser oscillator according to a first embodiment of the present invention. As shown in FIG. 1, a semiconductor light amplifier 1 is provided as a light-amplifying medium which operates in a gain saturation state, and comprises isolators 4, which are connected to the input and output of a semiconductor light-amplifying element 2 (optical negative feedback element), comprising a semiconductor waveguide, with collimating lenses 3 therebetween, the lenses 3 forming a collimate beam 6, and two additional lenses 3 which couple the semiconductor light amplifier 1 to optical fibers 5.

The semiconductor light-amplifying element 2 amplifies light by stimulated emission in the same manner as a semiconductor laser, but has features for blocking end-face reflection, such as an anti-reflection coat and diagonal emission faces. A window structure having a band-gap is provided in order to reduce the rate of absorption near the emission faces, and prevents damage to the end-face caused by amplified light. The isolators 4 not only block the return of the light, but also prevent unwanted spontaneous emission light, generated by the semiconductor light-amplifying element 2, from spreading throughout the laser oscillator 20, and thus function as traveling-wave light amplifiers which allow light to be transmitted in one direction only.

The light path is divided by providing a directional coupler 7 as a demultiplexer via the optical fiber 5 to the emission side of the semiconductor light amplifier 1. To each of the divided branches are provided an optical band pass filter 8, a polarization controller 9 for arranging the polarization plane of light which is transmitted along each of the divided paths, a power monitor 10, and a variable optical attenuator 11. The light transmitted along each of the divided paths are multiplexed by a directional coupler 18 which multiplexes and demultiplexes light, one output thereof being connected to the input of the semiconductor light amplifier 1 and thereby forming a laser resonator with ring topology, and the other output being used as laser light output.

Each of the power monitors 10 comprises a half-mirror 13, provided midway along the collimate beam formed by a lens 12, and a PD (photodiode) 14 which receives the light reflected by the half-mirror 13, and outputs an electrical signal corresponding to the strength of the light. Since one power monitor 10 is provided for each branch, it is possible to monitor power in correspondence with the transmission center wavelength of the optical band pass filter 8 provided to each branch.

A power controller 15 calculates the difference in power between the oscillating wavelengths based on the optical strength (monitor signal 16) of light of each wavelength detected by the power monitors 10, and generates an attenuator control signal 17 for controlling the amount of attenuation of the variable optical attenuator 11 so that the difference becomes zero. The variable optical attenuator 11 receives the attenuator control signal 17 and speedily changes the amount of attenuation accordingly, thereby realizing the laser oscillator 20 which is capable of equal-output simultaneous multiple-wavelength laser oscillation.

Incidentally, the reason for making the power equal at all oscillating wavelengths is as follows. For example, in the case of simultaneous laser oscillation at two wavelengths, when there is a discrepancy between the powers at the two oscillating wavelengths, the statistical distribution of the photons at the oscillating wavelength with higher power changes from Bose-Einstein distribution to Poisson distribution. In an extreme case, when the power of one oscillation wavelength approaches or reaches zero, the statistical distribution of photons at the other oscillation wavelength becomes the same as in conventional laser oscillation and can easily be tapped. That is, when there is a difference in the power between the oscillating wavelengths, the statistical distribution of the photons changes and quantum noise decreases, reducing the secrecy of the data and making it easier to tap. Therefore, the power at all oscillating wavelengths should preferably be made equal as far as is possible.

The total output of multiple-wavelength laser light which has been generated in this way is almost coherent and has photon statistics of Poisson distribution, but the individual wavelength components have photon statistics in compliance with disordered Bose-Einstein distribution and substantially disordered composite Poisson distribution (i.e. completely, or substantially, chaotic light). The reason why light at each wavelength of the laser light oscillated at multiple wavelengths becomes chaotic, or substantially chaotic, is as follows.

In a case where there is no correlation between the photons which form the photon trains, even when a beam of laser light having Poisson distribution photon statistics has been divided, the photon statistics of the branched laser light will comply with Poisson distribution. When the laser light is used as a communication carrier, attenuation of the signal during transmission has little adverse effect on the SN ratio (signal to noise ratio), and consequently the original signal can be restored by optical amplification. Therefore, although the SN ratio deteriorates slightly, multi-relay long-distance transmission using optical amplification is possible.

In contrast, according to the laser of the present embodiment oscillating at two wavelengths (e.g. wavelengths $\lambda_{11}$ and $\lambda_{12}$), when photons at the wavelength $\lambda_{11}$ have been generated by stimulated emission, the wavelength of subsequently generated photons is more likely to be $\lambda_{11}$ than $\lambda_{12}$. This signifies that there is temporal correlation between photons forming the photon train in the laser of this embodiment. It is believed that such correlation between photons makes the light at each wavelength of the multiple-wavelength laser oscillation chaotic, or substantially chaotic. One example of a probability process which closely resembles the above phenomenon occurs at a store where there are two queues, one long and one short, and people are more likely to join the shorter queue.

By using a continuous variable-wavelength filter as the band pass filter 8, laser light can be oscillated at any wavelengths.

Incidentally, in the laser oscillator 20 with ring topology described above, all the optical fibers may be replaced by polarization-maintaining fibers. In this case, when the laser resonator having the above constitution is provided by connecting the polarization-maintaining fibers while adjusting the polarization plane to the optimum (i.e. adjusting the polarization so as to maximize the optical output of the laser oscillator 20), similar effects can be obtained while omitting the polarization controller 9.

Furthermore, in the above description, the total laser light output complies with Poisson distribution, but the constitution is not limited to this. Normally, the statistical distribution of the sum of the photons in all modes when the laser is oscillating complies with Poisson distribution. However, when the laser oscillator operates slightly below the threshold of laser oscillation, the statistical distribution is not Poisson distribution but becomes a sub-Poisson distribution which is narrower than the Poisson distribution shown in FIG. 5. This sub-Poisson distribution achieves the same effects as Poisson distribution.

EMBODIMENT 2

Figure 2:
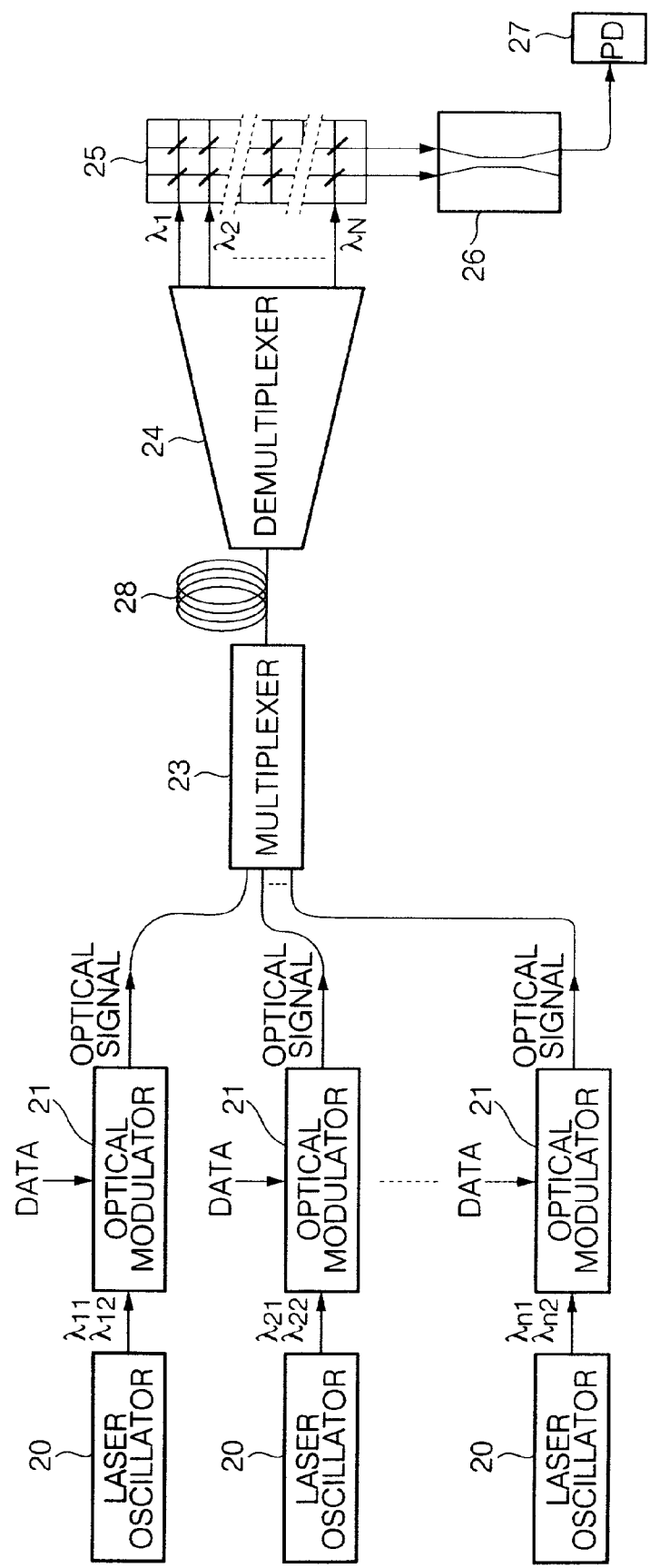
FIG. 2 is a block diagram showing an optical communication method according to a second embodiment of the present invention.

FIG. 2 is a block diagram showing an optical communication method according to a second embodiment of the present invention. As shown in FIG. 2, an optical communication system is provided with a transmitting section, a receiving section, and a transmission path 28 therebetween. The transmitting section comprises, for example, a plurality of laser oscillators 20 according to the first embodiment, which generate laser light (at two simultaneous wavelengths laser oscillation in this example) such as $\lambda_{11}$, $\lambda_{12}$ (i=1, 2, . . . n). The 2n wavelengths are set to different values. Optical modulators 21 create optical signals by encoding simultaneously at two wavelengths based on data to be transmitted, and a multiplexer 23 multiplexes the optical signals and transmits them in a single transmission via the transmission path 28.

In the receiving section, a demultiplexer 24 temporarily demultiplexes all the wavelength components. A wavelength multiplexer/demultiplexer using an array waveguide grating, for example, be used as the demultiplexer 24. Since the wavelengths which can be filtered-out are determined in advance, the oscillating wavelengths of the laser oscillators 20, provided in the transmitting section, must be adjusted beforehand to the wavelength of the filtered-out light in the receiving section.

Then, a 2×N optical switch 25 is provided after the demultiplexer 24, and selects the two wavelengths generated by the original laser oscillator 20 from among the wavelength components $\lambda_1, \lambda_2, \ldots, \lambda_N$, demultiplexed by the demultiplexer 24. The optical outputs corresponding to the selected wavelengths are multiplexed by a directional coupler 26. One output from the directional coupler 26 is input to a photodiode 27 which directly detects it, and the data is demodulated. A relationship of N=2n is established between the above wavelengths $\lambda_{11}$ to $\lambda_{n2}$ and $\lambda_1$ to $\lambda_N$, and there is one-to-one correspondence between the each wavelength (e.g. $\lambda_{n2}$) of the transmitting section and any one of the wavelengths of the receiving section (e.g. $\lambda_1$).

Data representing which wavelengths to choose is agreed on in advance as secret information at the transmitting and receiving sections. Only noise can be detected when a signal is independently received at each wavelength. Consequently, unless the above agreement is known, it is not easy to select the correct wavelengths from the great number of multiplexed optical signals.

EMBODIMENT 3

Figure 3:
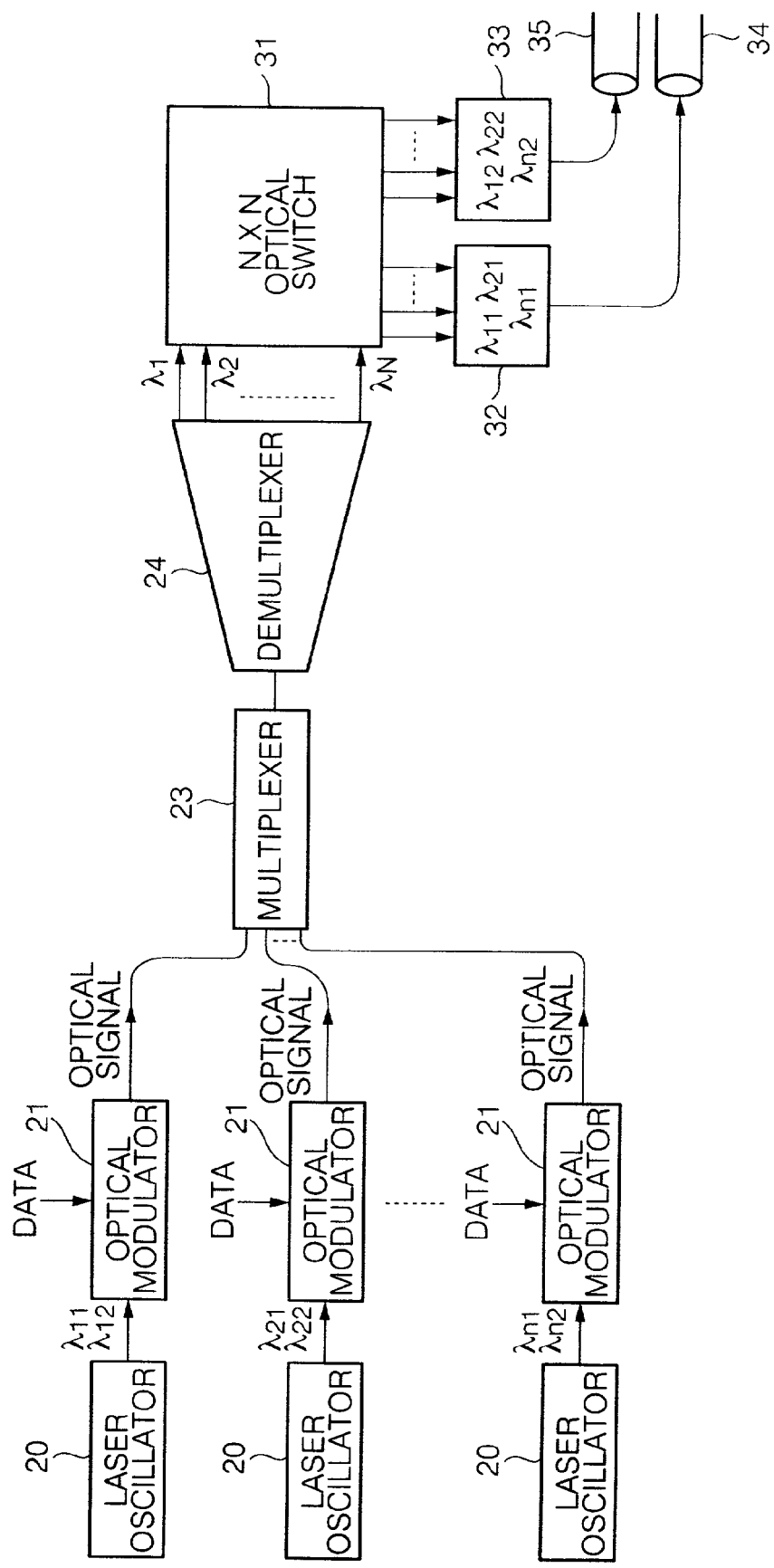
FIG. 3 is a block diagram of a transmitting side showing an optical communication method according to a third embodiment of the present invention.
Figure 4:
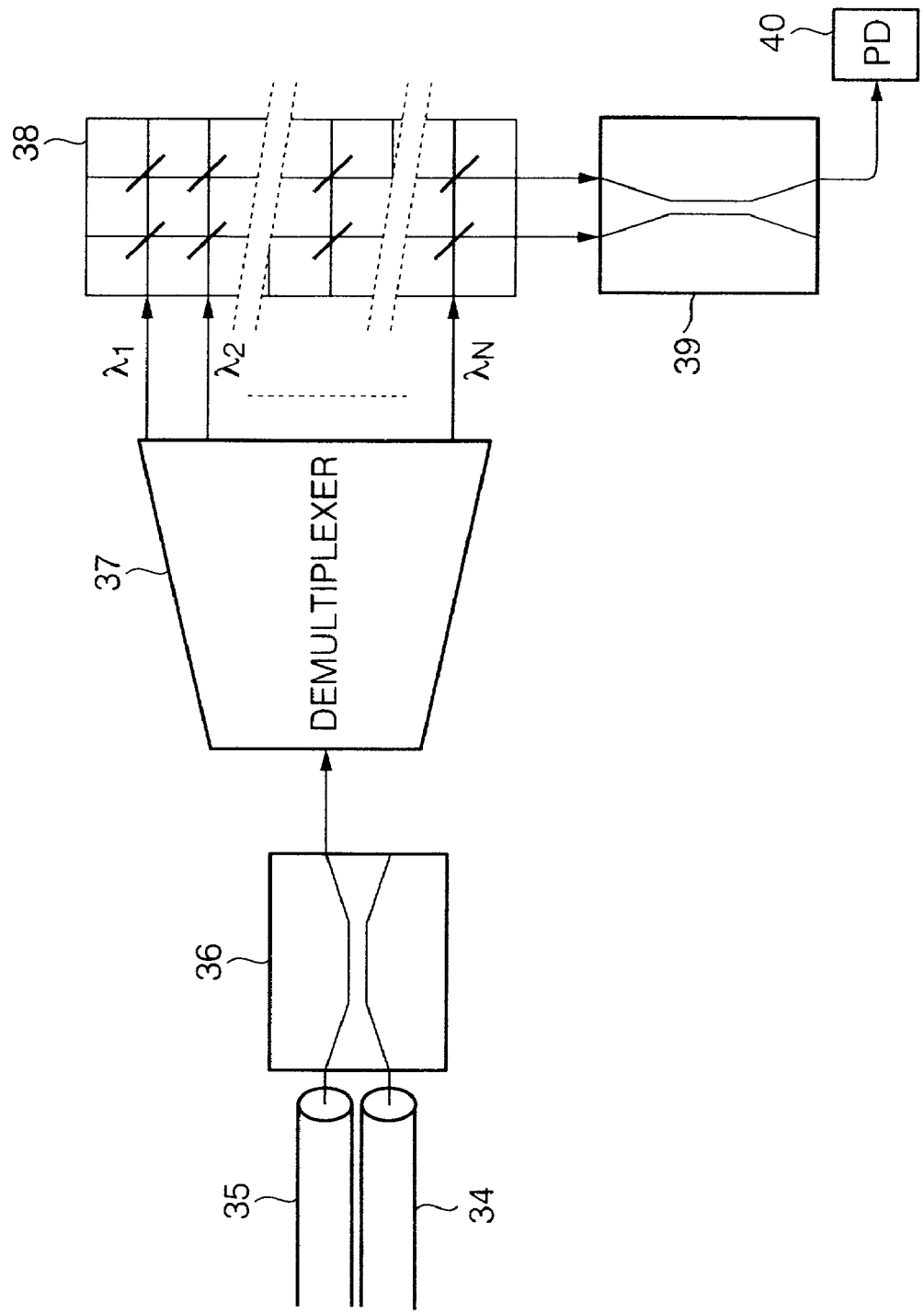
FIG. 4 is a block diagram of a receiving side showing the optical communication method according to the third embodiment of the present invention.

FIGS. 3 and 4 are diagrams showing an optical communication method according to a third embodiment of the present invention. FIG. 3 shows the constitution of a transmitting section, which is the same as the second embodiment in that it comprises a plurality of units for obtaining optical signals by using optical modulators 21 to encode data to be added to laser light from the laser oscillators 20, simultaneously oscillated at two wavelengths.

The multiplexer 23 multiplexes the optical signals, and the demultiplexer 24 demultiplexes them into their separate wavelength components $\lambda_1, \lambda_2, \ldots, \lambda_N$. Thereafter, an N×N optical switch 31 rearranges the simultaneously oscillation wavelengths $\lambda_{11}, \lambda_{12}$ (i=1, 2, . . . , n) by dividing them into two wavelength groups $\lambda_{11}, \lambda_{21}, \ldots, \lambda_{n1}$ and $\lambda_{12}, \lambda_{22}, \ldots, \lambda_{12}$. Moreover, two multiplexers 32 and 33 create wavelength-multiplexed signals by multiplexing each of the two wavelength groups, and transmit them along independent and equidistant optical paths, comprising transmission paths 34 and 35. In equidistant transmission, a difference in distance which is shorter than the coherence length can be tolerated as error.

FIG. 4 shows the constitution of the receiving section which demodulates the data from the two wavelength-multiplexed signals. As shown in FIG. 4, in the receiving section, the two wavelength-multiplexed signals which have been transmitted along the transmission paths 34 and 35 are multiplexed by a directional coupler 36, and then divided into wavelength components $\lambda_1, \lambda_2, \ldots, \lambda_N$ by a demultiplexer 37 such as an array waveguide grating. Thereafter, a 2×N optical switch 38, provided after the demultiplexer 37, selects a pair of wavelengths corresponding to the two wavelengths originally generated by the laser oscillators 20 from the wavelength components $\lambda_1, \lambda_2, \ldots, \lambda_N$, which have been demultiplexed by the demultiplexer 37. A directional coupler 39 multiplexes the pair of wavelengths, and a PD 40 demodulates the data by direct detection. At this time, the correct combination of wavelengths is notified to the receiving section beforehand as secret information, in the same manner as in the second embodiment.

In the above-mentioned third embodiment, due to the physical separation of the transmission paths 34 and 35, the pair of optical signals at two wavelengths can no longer be obtained simultaneously, and consequently it is possible to completely prevent the data from being illicitly obtained by tapping.

EMBODIMENT 4

Figure 7:
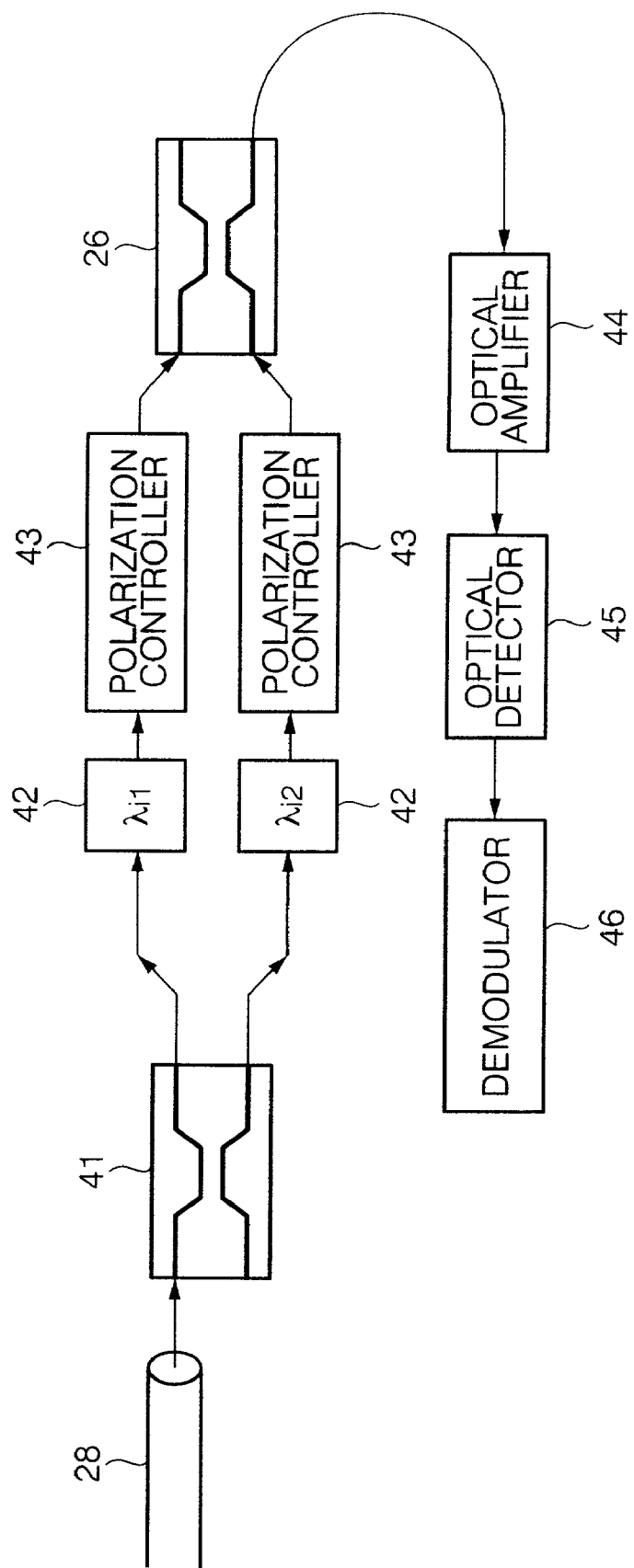
FIG. 7 is a block diagram of the constitution of a receiving side showing an optical communication method according to a fourth embodiment of the present invention.

The fourth embodiment is a modification of the receiving section in the optical communication system shown in FIG. 2 (second embodiment). FIG. 7 is a block diagram showing the constitution of the receiving section according to the fourth embodiment. In FIG. 7, the same parts as those shown in FIG. 2 are represented by the same reference numerals. This embodiment is characterized in that a polarization controller is provided on each of the paths which link the 2×N optical switch 25 to the directional coupler 26 shown in FIG. 2.

As already described in the first embodiment, according to the laser oscillator 20 shown in FIG. 1, the polarization plane of light, which travels along divided optical paths, is arranged by using the polarization controller 9. Therefore, when transmitting the wavelength-multiplexed signals along a single transmission path 28 (single optical fiber) as shown in FIG. 2, no polarization controller is required, since the polarization planes change simultaneously. Nevertheless, on the receiving side, there is a possibility that the polarization plane will change due to the different polarization characteristics at each wavelength, whereby the polarization plane will be different at each wavelength. The polarization controller must be provided in order to compensate the difference.

In FIG. 7, a directional coupler 41 and wavelength-selecting filters 42 and 42 correspond to the demultiplexer 24 and the 2×N optical switch 25 of FIG. 2. That is, the directional coupler 41 divides the wavelength-multiplexed signals from the transmission path 28 into two directions, and the wavelength-selecting filters 42 and 42 select wavelength components of the wavelengths $\lambda_{11}$ and $\lambda_{12}$. Consequently, two wavelength components are selected and demultiplexed into wavelength components in the same way as in FIG. 2. Polarization controllers 43 and 43 arrange the polarization planes of the wavelength components, output from the wavelength-selecting filters 42 and 42, and transmit them to the directional coupler 26. An optical amplifier 44 amplifies the wavelength-multiplexed signal, which has been multiplexed by the directional coupler 26, and outputs to an optical detector 45. The optical detector 45 corresponds to the PD 27 shown in FIG. 2, and directly detects the output of the optical amplifier 44 and converts it to an electrical signal. A demodulating circuit 46 demodulates the data transmitted by the transmitting side based on the electrical signal, output from the optical detector 45. Incidentally, the optical amplifier 44 and the demodulating circuit 46 are omitted in FIG. 2.

EMBODIMENT 5

Figure 8:
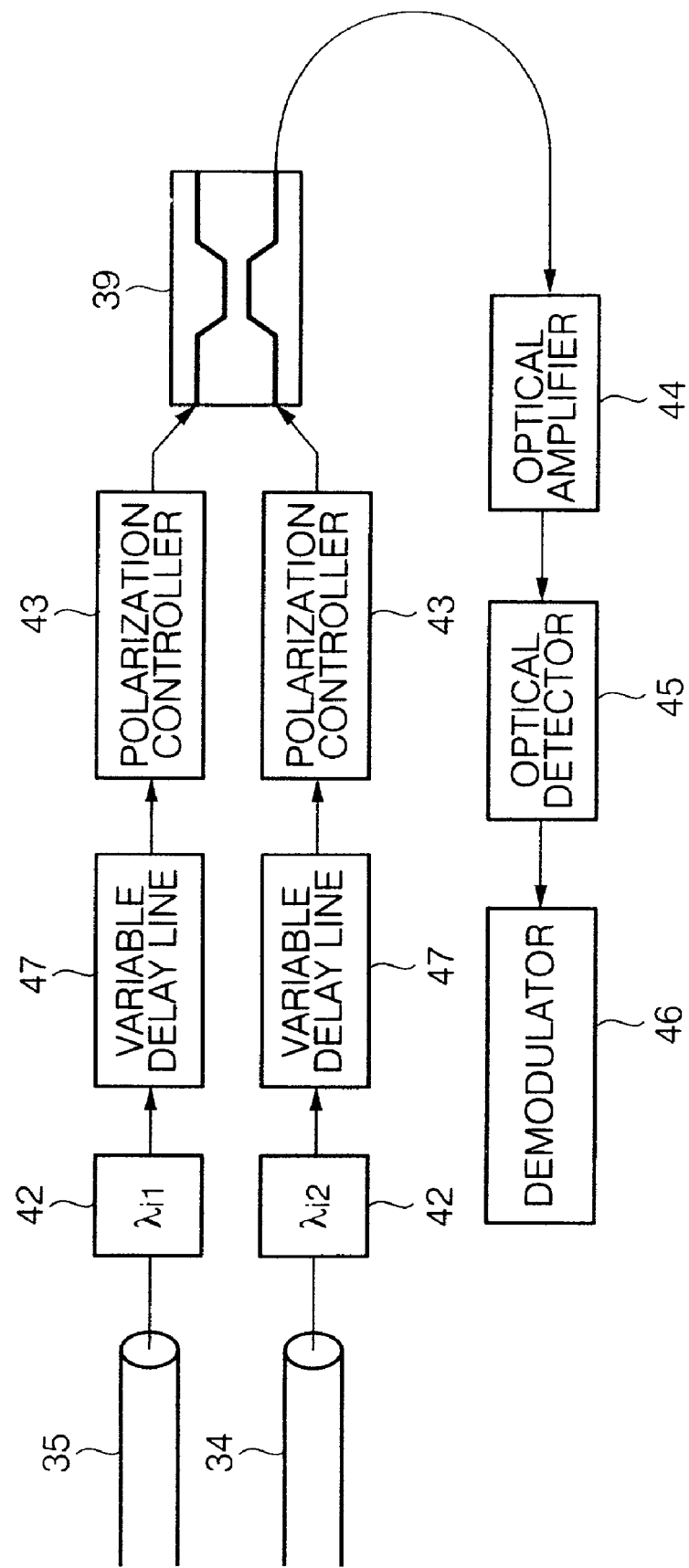
FIG. 8 is a block diagram of the constitution of a receiving side showing an optical communication method according to a fifth embodiment of the present invention.

The fifth embodiment provides another modification of the receiving section in the optical communication system shown in FIG. 4 (third embodiment). FIG. 8 is a block diagram showing the constitution of the receiving section according to the fifth embodiment. In FIG. 8, the same parts as those shown in FIGS. 4 and 7 are represented by the same reference numerals. This embodiment is characterized in that, in addition to the polarization controllers 43 on the two paths in the same way as in the fourth embodiment, delay circuits, comprising variable delay lines and the like, are provided each of the paths which link the 2×N optical switch 38 to the directional coupler 39 shown in FIG. 4.

In a case such as that shown in FIG. 4, where the wavelengths are divided for each path and wavelength-multiplexed signals are transmitted on different transmission paths, there is a possibility that the polarization characteristics will differ at each wavelength in the receiving section, as described in the fourth embodiment. For this reason, the polarization controllers 43 are similarly provided on each path in the present embodiment.

Furthermore, when dividing the wavelengths for each path and transmitting wavelength-multiplexed signals on different transmission paths in the manner already described, there is a possibility that the polarization planes of the light being transmitted on each path will deviate from each other. Here, in the third embodiment described above, light of two wavelength components selected on the receiving section are transmitted equidistantly so that they will be detected simultaneously, keeping the total strength of the light of these wavelength components at a constant value. However, there is a possibility that the transmission times on each path will differ as a result of differences in the transmission distances and the like of each path. In such a case, it becomes impossible to keep the total strength of light transmitted along multiple paths at a constant value. The above-mentioned delay circuits must be provided to compensate the difference.

In FIG. 8, the wavelength-selecting filters 42 and 42 correspond to the directional coupler 36, the demultiplexer 37, and the 2×N optical switch 38 of FIG. 4. That is, the wavelength-selecting filters 42 and 42 select wavelength components of the wavelengths $\lambda_{11}$ and $\lambda_{12}$ from the wavelength-multiplexed signals which have been transmitted along the transmission paths 34 and 35 respectively. Variable delay lines 47 and 47 delay the optical signals of each wavelength component, selected by the wavelength-selecting filters 42 and 42, so that the optical signals of these wavelength components reach the polarization controllers 43 and 43 simultaneously. The constitution and operation subsequent to the polarization controllers 43 are the same as the fourth embodiment.

The polarization controllers 43 and the variable delay lines 47 are both provided in FIG. 8, but the constitution is not restricted to this, and they may be provided as required. Therefore, it is acceptable to provide the polarization controllers 43 without the variable delay lines 47. Alternatively, the polarization controllers 43 may be omitted and only the variable delay lines 47 are provided.

EMBODIMENT 6

Figure 9:
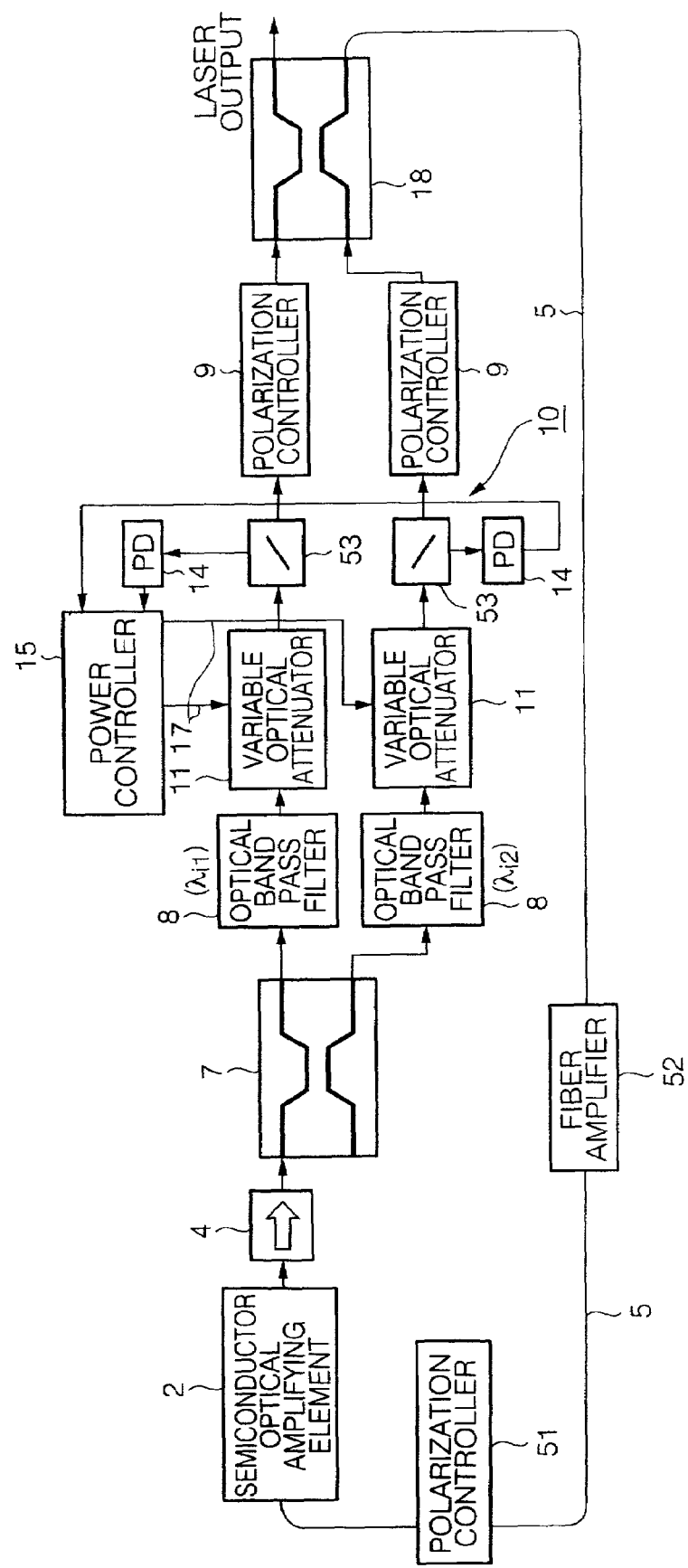
FIG. 9 is a block diagram showing the constitution of a laser oscillator according to a sixth embodiment of the present invention.

FIG. 9 is a block diagram showing the constitution of a laser oscillator according to a sixth embodiment of the present invention, which comprises a fiber ring construction. In FIG. 9, the parts which are the same as those in FIG. 1 (first embodiment) are represented by the same reference numerals. Parts corresponding to the lenses 3 and the lenses 12 of FIG. 1 are not provided in this embodiment. In FIG. 1, the isolators 4 are provided at the input and output sides of the semiconductor light-amplifying element 2, but in the present embodiment, the isolator 4 is provided only at the output side of the semiconductor light-amplifying element 2.

Furthermore, in this embodiment, a polarization controller 51 and a fiber amplifier 52 are provided between the output of the directional coupler 18 and the input of the semiconductor light-amplifying element 2. The polarization controller 51 adjusts the polarization plane of light, transmitted along the optical fiber 5, to that of the semiconductor light-amplifying element 2. The fiber amplifier 52 amplifies the light, which attenuates as it passes around the fiber ring. In addition, the half-mirrors 13 of FIG. 1 are replaced in this embodiment by optical dividers 53. The operation of the laser oscillator of this embodiment will not be explained, since it is basically the same as that of the laser oscillator of the embodiment shown in FIG. 1. The fiber amplifier 52 may be omitted when the laser output is sufficiently strong without it.

EMBODIMENT 7

Figure 10:
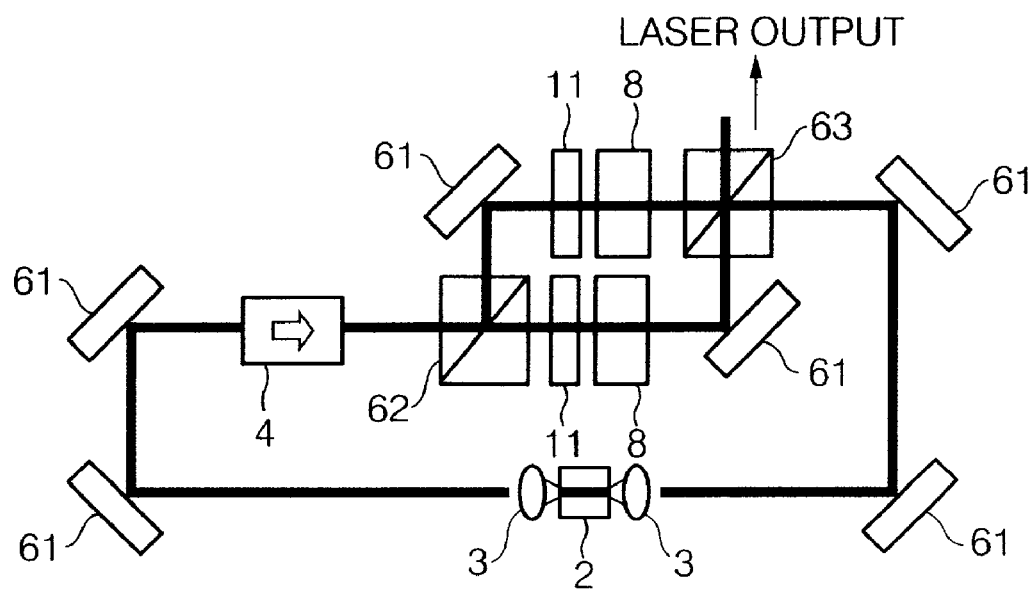
FIG. 10 is a block diagram showing the constitution of a laser oscillator according to a seventh embodiment of the present invention.

FIG. 10 is a block diagram showing the constitution of a laser oscillator according to a seventh embodiment of the present invention, which comprises a spatial ring construction. In FIG. 10, the parts which are the same as those in FIG. 1 (first embodiment) are represented by the same reference numerals. In the seventh embodiment, the optical signal is not transmitted along an optical fiber 5, as in the first embodiment, but are transmitted through space, with six mirrors 61 forming a transmission path for the optical signals. The directional coupler 7 of FIG. 1 is replaced in this embodiment by a beam splitter 62, which divides the optical path in two.

Moreover, in this embodiment, the directional coupler 18 of FIG. 1 is replaced in this embodiment by a beam splitter 63. The optical signals, which have been transmitted along the divided optical paths, are multiplexed; one output is returned to the spatial ring, and the other output is extracted as laser output. Since there is no rotation of polarization in a spatial system such as that of this embodiment, there is no need to provided polarization controllers such as the polarization controllers 9 shown in FIG. 1. A constitution similar to that comprising the lenses 12, the half-mirrors 13, the PD 14, and the power controller 15 shown in FIG. 1, may be provided in order to adjust the amount of attenuation of the variable optical attenuator 11, though such a constitution is not illustrated in FIG. 10.

The laser oscillator of this embodiment is functionally equivalent to that of the first embodiment. The optical signal is output from the semiconductor light-amplifying element 2, and sequentially reflected by the mirrors 61 and 61 via the lens 3; thereafter, the signal passes the isolator 4 and is split in two by the beam splitter 62. One of the split beams of light is reflected by the mirror 61, the reflected light is attenuated to a predetermined amount by the variable optical attenuator 11, and the band pass filter 8 selects, for example, the wavelength component $\lambda_{11}$. The other split beam is attenuated by the variable optical attenuator 11, and is reflected by the mirror 61 after the band pass filter 8 has selected, for example, the wavelength component $\lambda_{12}$. The beam splitter 63 multiplexes the optical signals of the selected wavelength components $\lambda_{11}$ and $\lambda_{12}$, part of which is extracted as laser output, the remainder being sequentially reflected by the mirrors 61 and 61 and input via another lens 3 to the semiconductor light-amplifying element 2.

EMBODIMENT 8

Figure 11:
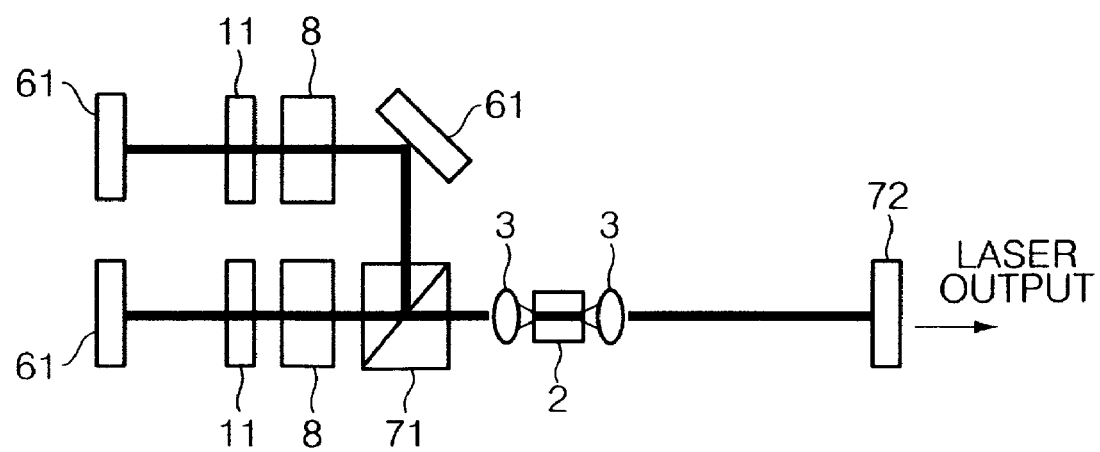
FIG. 11 is a block diagram showing the constitution of a laser oscillator according to an eighth embodiment of the present invention.

FIG. 11 is a block diagram showing the constitution of a laser oscillator according to an eighth embodiment of the present invention, which comprises a Fabry-Perot construction. In FIG. 11, the parts which are the same as those in FIG. 1 (first embodiment) and FIG. 10 (seventh embodiment) are represented by the same reference numerals. In the seventh embodiment, the isolator 4 is provided since the optical signal is transmitted around the spatial ring in only one direction, but in the eighth embodiment, the isolator is not required since mirrors are used to send the optical signal back in the other direction. A section corresponding to the polarization controller 9 is not required either, since the eighth embodiment uses spatial transmission.

In this embodiment, the beam splitters 62 and 63 of FIG. 10 are replaced by a beam splitter 71. The beam splitter 71 splits the optical signal, output from the semiconductor light-amplifying element 2 via the lens 3, into two paths, and multiplexes the optical signals when they return from the two paths, outputting them via a lens 3 to the semiconductor light-amplifying element 2. In FIG. 10, the beam splitter 63 extracts the laser output from the spatial ring, but in the eighth embodiment, a half-mirror 72 is provided on the opposite side of the semiconductor light-amplifying element 2 from the beam splitter 71. The half-mirror 72 extracts part of the optical signal, output via the lens 3 from the semiconductor light-amplifying element 2, and returns the remainder to the semiconductor light-amplifying element 2. As in the seventh embodiment, a circuit for adjusting the amount of attenuation of the variable optical attenuator 11 may be provided.

The laser oscillator of this embodiment is functionally equivalent to that of the first and seventh embodiments. The optical signal, output from the semiconductor light-amplifying element 2, passes the lens 3 and is split by the beam splitter 71. As in the seventh embodiment, the band pass filters 8 select wavelength components from the split beams of light, and they are attenuated to a predetermined amount by the variable optical attenuator 11. Thereafter, the two optical signals are reflected by the mirrors 61 and 61, and then transmitted back along the paths they have just traveled to the beam splitter 71, which multiplexes them; then, the beam passes the lens 3 and is input to the semiconductor light-amplifying element 2. Some of the light which is output from the semiconductor light-amplifying element 2 is extracted as laser output by the half-mirror 72, the remainder being reflected back to the semiconductor light-amplifying element 2. As in the seventh embodiment, a circuit for adjusting the amount of attenuation of the variable optical attenuator may be provided.

EMBODIMENT 9

Figure 12:
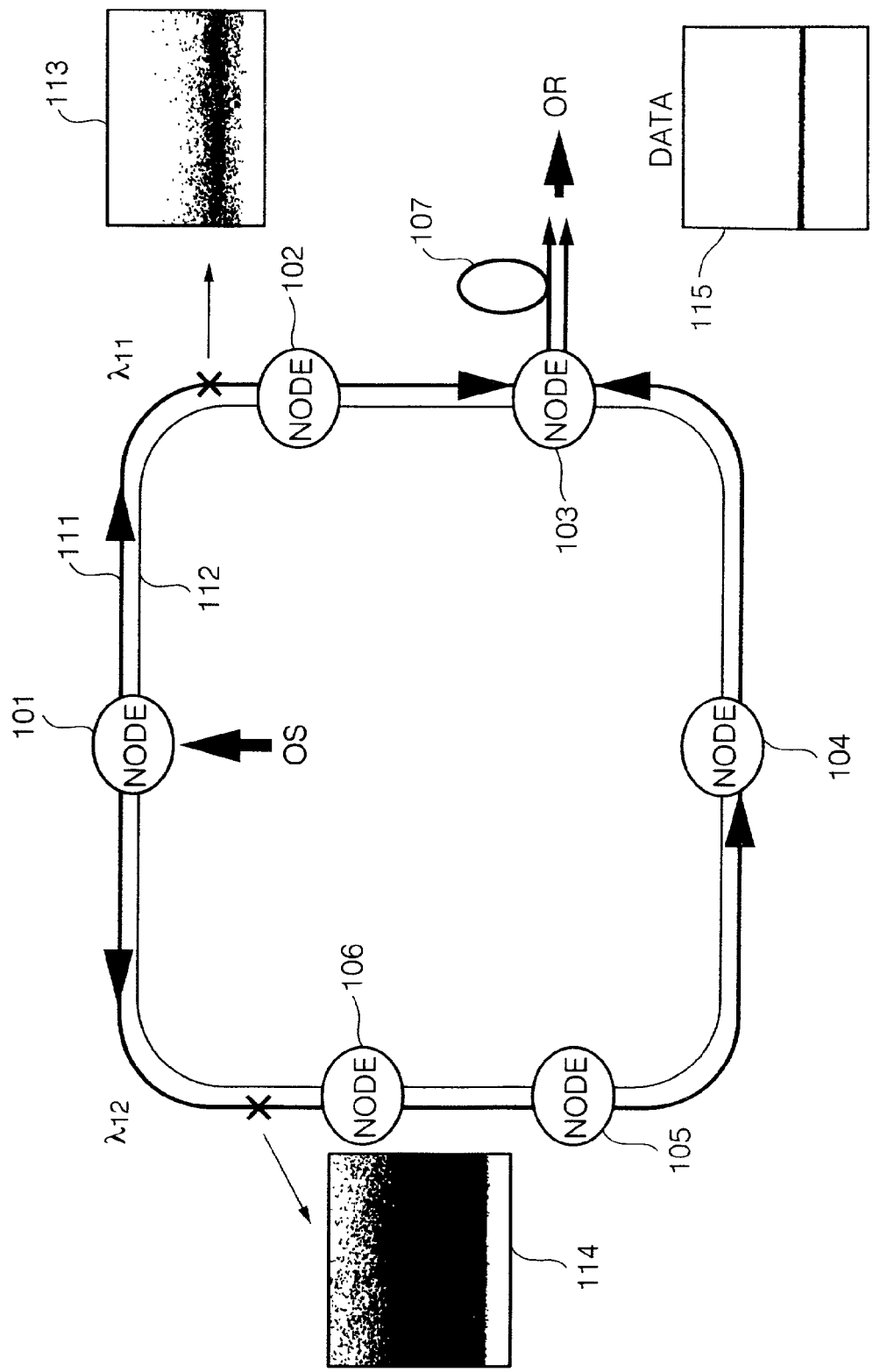
FIG. 12 is a block diagram showing an optical communication system according to a ninth embodiment of the present invention.

FIG. 12 is a block diagram showing the constitution of an optical communication system according to a ninth embodiment of this invention, comprising a network using optical ring topology. In FIG. 12, reference numerals 101 to 106 represent nodes which comprise an optical ring network, and each of the nodes comprises the transmitting section and receiving section (unillustrated in FIG. 12) which were described in the previous embodiments. Alternatively, each node may comprise either a transmitting section or receiving section only. Reference numeral 107 represents an optical fiber which comprises the variable delay line 47 shown in FIG. 8.

Reference numerals 111 and 112 represent logical paths which the wavelength components are transmitted along on the optical ring network. For example, supposing that the node 101 outputs a signal light comprising the wavelength components $\lambda_{11}$ and $\lambda_{12}$, the wavelength component $\lambda_{11}$ passes around the path 111 in the clockwise direction, while the wavelength component $\lambda_{12}$ travels in the opposite direction from the wavelength component $\lambda_{11}$ (counter-clockwise direction) on the path 112. Incidentally, the paths 111 and 112 may be realized by a single optical fiber, or by two different optical fibers.

Now let us suppose that data is transmitted from the node 101 to the node 103. The node 101 on the transmitting side adds the data to the optical signals, and, when the signal light comprising the wavelength components $\lambda_{11}$ and $\lambda_{12}$ are transmitted to the paths 111 and 112 respectively, the optical signals pass around the paths 111 and 112. When the optical signal comprising the wavelength component $\lambda_{11}$ is extracted from the path 111, the extracted signal is noise as shown by reference numeral 113, and the data cannot be demodulated. The result is the same when the optical signal comprising the wavelength component $\lambda_{12}$ is extracted from the path 112, as shown by reference numeral 114. On the other hand, since the node 103 on the receiving side has been notified in secret information to select the wavelength components $\lambda_{11}$ and $\lambda_{12}$, the node 103 can obtaining an optical signal without noise, as shown by reference numeral 115, by selecting the wavelength components $\lambda_{11}$ and $\lambda_{12}$ and multiplexing them, thereby the data can be demodulated.

EMBODIMENT 10

Figure 13:
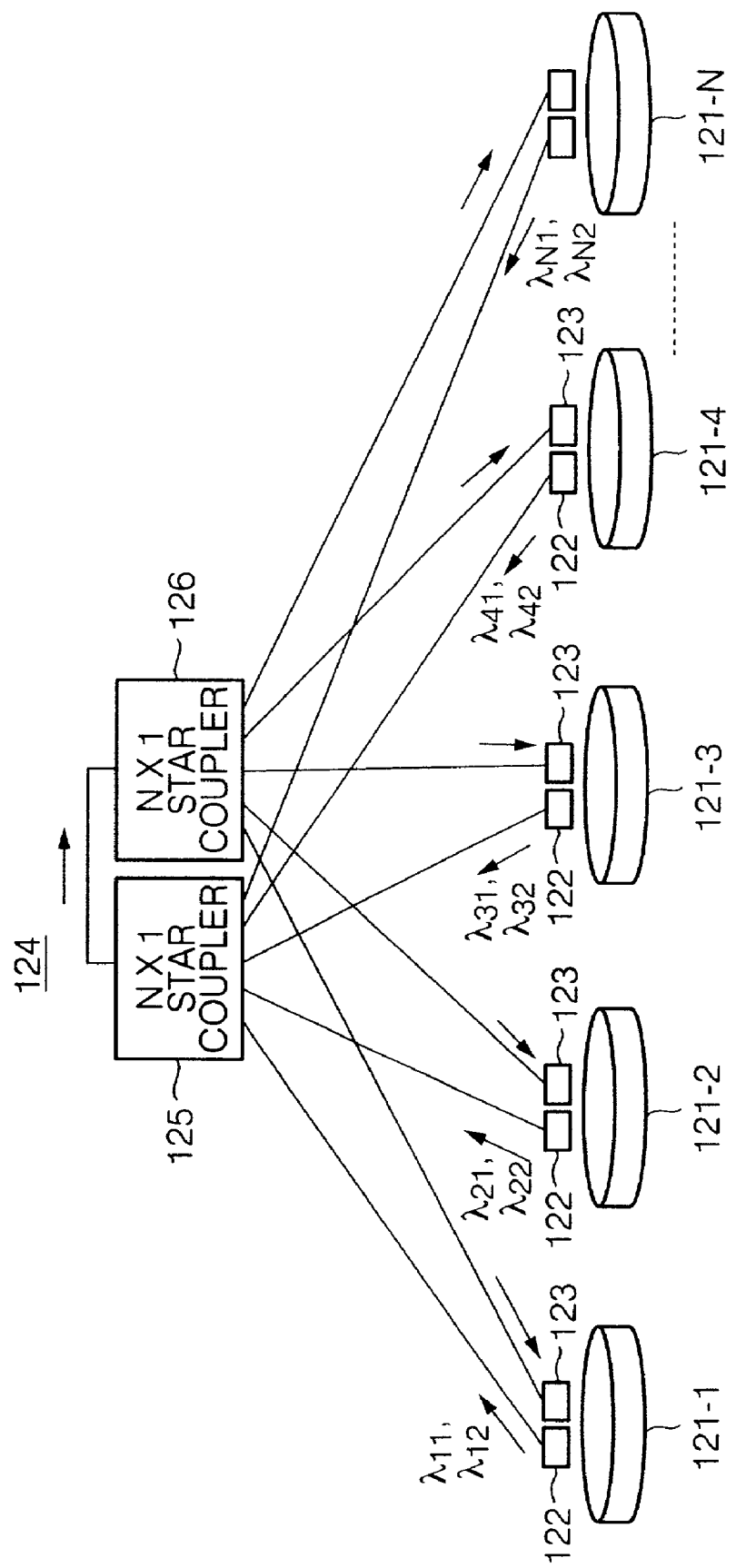
FIG. 13 is a block diagram showing an optical communication system according to a tenth embodiment of the present invention.

FIG. 13 is a block diagram showing the constitution of an optical communication system according to a tenth embodiment of the present invention, comprising a network with star topology. In FIG. 13, reference numerals 121-1 to 121-N represent nodes which comprise an optical star network, and each of the nodes has a transmitter 122 and a receiver 123, comprising the transmitting and receiving sections which were described in the previous embodiments. The transmitters 122 transmit optical signals of wavelength components which are unique to each node. That is, the node 121-1 transmits an optical signal of the wavelength components $\lambda_{11}$ and $\lambda_{12}$, and so on, the node 121-N transmitting an optical signal of the wavelength components $\lambda_{N1}$ and $\lambda_{N2}$. Reference numeral 124 represents an N×N star coupler, which can be realized by combining, for example, N×1 star couplers 125 and 126.

When the node 121-1 outputs an optical signal of the wavelength components $\lambda_{11}$ and $\lambda_{12}$, which data has been added to, this optical signal is transmitted via the N×1 star coupler 125 to the N×1 star coupler 124, which distributes the optical signal to all the nodes 121-1 to 121-N. Similarly, the optical signals of the wavelength components $\lambda_{21}$ to $\lambda_{N2}$, output from the nodes 121-2 to 121-N, are transmitted to all the nodes. Then, the nodes which have been notified in secret information to select the wavelength components $\lambda_{11}$ and $\lambda_{12}$ select these wavelength components from the optical signals, received by the receivers 123, and can demodulate the data transmitted from the node 121-1 by multiplexing the wavelength components $\lambda_{11}$ and $\lambda_{12}$ and directly detecting the optical signal.

The above embodiments can, of course, be combined.

EXPERIMENTAL EXAMPLE

Figure 14:
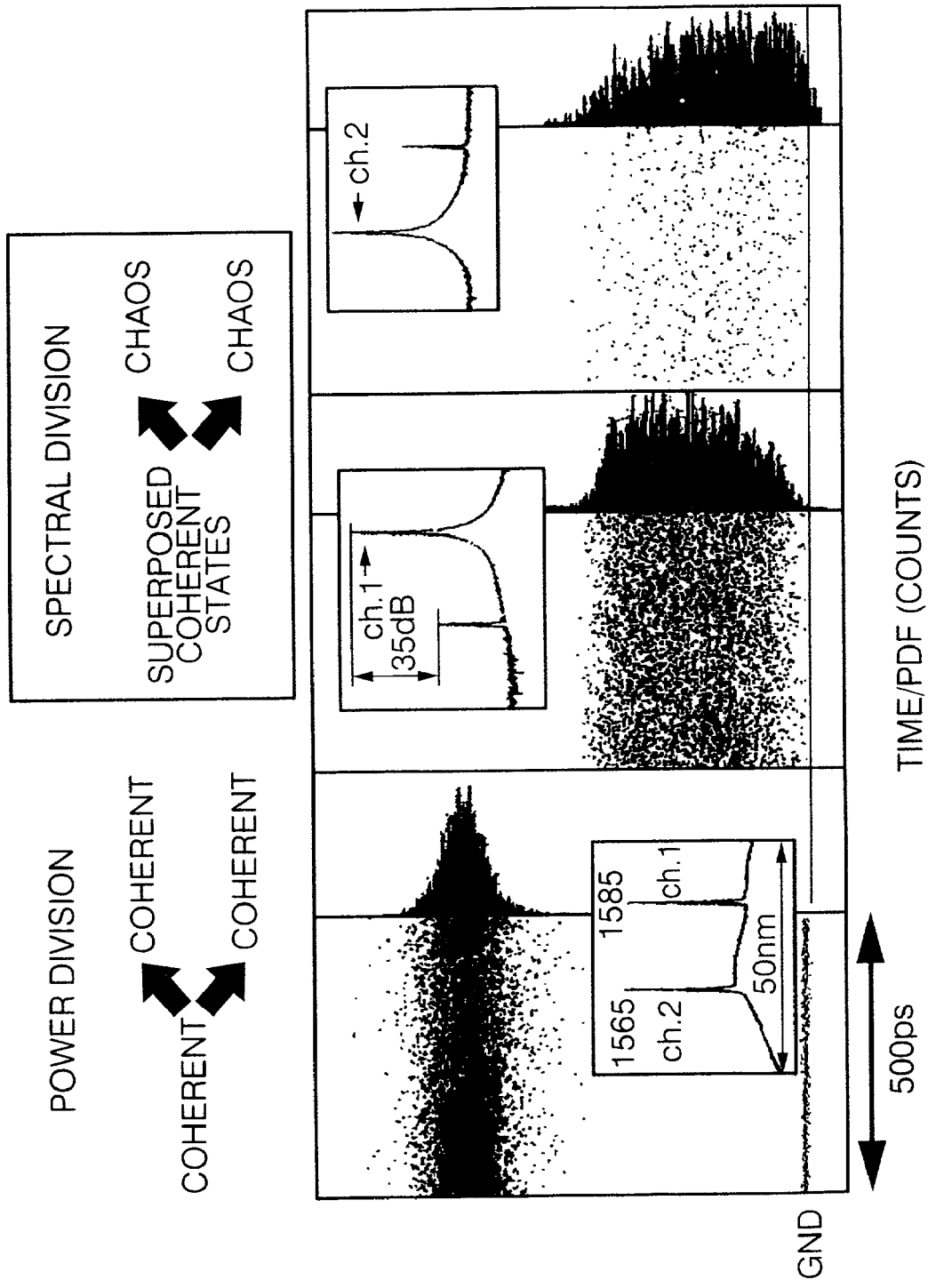
FIG. 14 is a diagram showing experimental results of the present invention.

FIG. 14 is a diagram showing measurements of laser light which was output from a laser oscillator, provided on a transmitting side. The graph at the left end relates to the total output of laser light, and shows the time waveform (horizontal axis: time, vertical axis: light strength {in arbitrary units}) and the power spectrum (horizontal axis: frequency, vertical axis: probability distribution function {PDF} counts). The graph shows a power spectrum having Poisson distribution similar to that of normal laser oscillation. The wavelength components in the output light are set to 1585 {nm} (ch.1 in FIG. 14) and 1565 {nm} (ch. 2 in FIG. 14). The center and right-end graphs show the time waveforms and power spectra for the ch.1 and ch.2 sides when they are split in two, chaotic light being detected in both cases.

Figure 15:
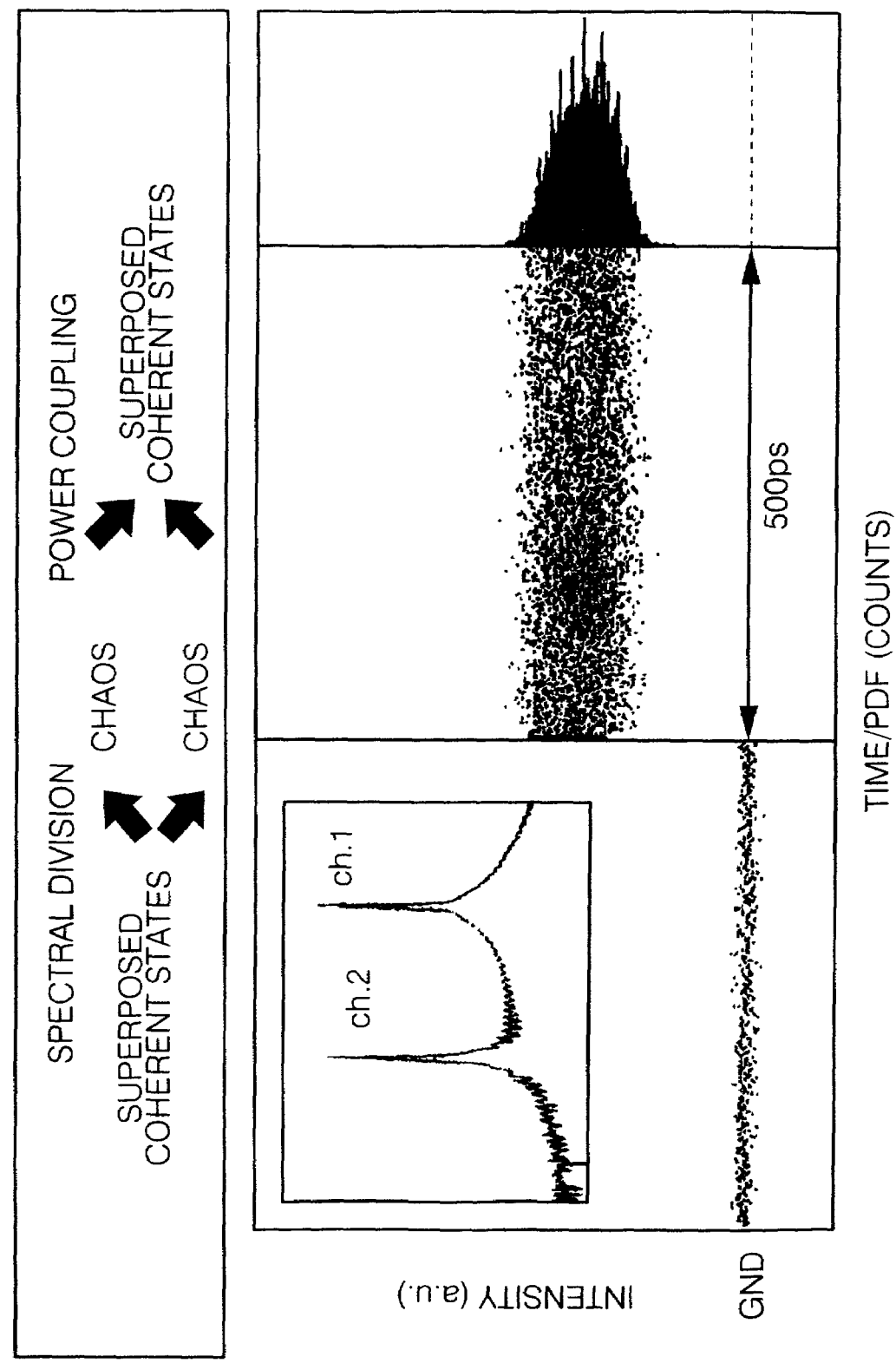
FIG. 15 is a diagram showing experimental results of the present invention.

FIG. 15 is a diagram showing measurements when optical signal from two split paths was multiplexed at the receiving side and directly detected, and shows time waveform and power spectra as in FIG. 14. As shown in FIG. 15, the strengths of the two wavelength components are substantially equal, and, although the optical strength is less than that of the transmitting side, the spectrum has approximately the same Poisson distribution as the transmitting side. Since the data was not modulated in the experiment, the eye pattern is not observed in FIGS. 14 and 15, but can be observed by modulation.

What is claimed is:

1. A laser oscillator which outputs laser light oscillated simultaneously at a plurality of wavelengths, the total number of generated photons being constant,
   wherein the laser oscillator comprises:
   an optical negative feedback element; and
   a plurality of band pass filters which are connected to the optical negative feedback element and have different transmission center wavelengths,
   wherein single peak modes matching the transmission center wavelengths of the band pass filters are oscillated simultaneously, the statistical distribution of photons in each mode complies with thermal distribution, and the total number of photons of a sum of a plurality of modes is constant.

2. The laser oscillator as described in claim 1, the optical negative feedback element being a semiconductor light amplifier which operates in a gain saturation state.

3. The laser oscillator as described in claim 1, the laser oscillator being a ring resonator which uses an optical fiber, and further comprising:
   a divider which divides the optical path of the ring resonator into a plurality of branches at a predetermined location, and outputs the divided light to the band pass filters; and
   a coupler which multiplexes transmitted light from the band pas filters, and couples the multiplexed light to one optical fiber; and
   the laser oscillator simultaneously oscillating laser light in a plurality of different wavelength modes within the ring resonator.

4. The laser oscillator as described in claim 1, further comprising:
   a plurality of variable optical attenuators, which are provided at each branch and attenuate light, transmitted along each branch; and
   a control circuit which adjusts the variable optical attenuators so as to equalize the optical strengths of transmission center wavelengths of each band pass filter.

5. The laser oscillator as described in claim 3, wherein a polarization controller, which aligns the polarization planes of the branches by adjusting the polarization planes of each branch, is provided in the ring resonator.

6. The laser oscillator as described in claim 3, wherein the optical fibers, which form the ring resonator, comprise polarization-maintaining fibers, the polarization state of the polarization-maintaining fibers being adjusted so as to maximize the optical output of the laser resonator.

7. The laser oscillator as described in claim 3, further comprising a polarization controller which matches the polarization plane of light, which is transmitted on the optical fibers, to the polarization plane of the optical negative feedback element.

8. A transmitter comprising:
   a plurality of laser oscillators which output laser light oscillated simultaneously at a plurality of wavelengths, the total number of generated photons being constant;
   a plurality of optical modulators which add identical data to the laser light, output by the plurality of laser oscillators, and output optical signals; and
   a coupler which multiplexes the plurality of optical signals, output by the plurality of optical modulators, and transmits a wavelength-multiplexed signal,
   wherein each of the laser oscillators comprises:
   an optical negative feedback element; and
   a plurality of band pass filters which are connected to the optical negative feedback element and have different transmission center wavelengths,
   wherein single peak modes matching the transmission center wavelengths of the band pass filters are oscillated simultaneously, the statistical distribution of photons in each mode complies with thermal distribution, and the total number of photons of a sum of a plurality of modes is constant.

9. The transmitter as described in claim 8, further comprising a separator which separates wavelength components, comprising the wavelength-multiplexed signals output by the coupler, so that a plurality of wavelengths, oscillated simultaneously by each individual laser oscillator, all belong to different wavelength groups; and
   a plurality of couplers which generate a plurality of wavelength-multiplexed signals by multiplexing light from each of the wavelength groups, and transmit the multiplexed light to transmission paths corresponding to the wavelength-multiplexed signals.

10. A receiver comprising:
    selectors which receive wavelength-multiplexed optical signals from a transmission path, the optical signals being transmitted by adding identical data to a plurality of laser lights oscillating simultaneously at a plurality of wavelengths, the total number of generated photons being constant, and select combinations of plurality of simultaneously oscillated wavelength components from the wavelength components contained in the optical signals;
    a coupler which multiplexes light of the selected combinations of a plurality of simultaneously oscillated wavelength components; and
    demodulators which demodulate data by directly detecting the multiplexed light.

11. The receiver as described in claim 10, wherein the optical signals are transmitted on different transmission paths for each of the plurality of wavelength groups, so that a plurality of simultaneously oscillated wavelengths all belong to different wavelength groups, and further comprising a coupler which multiplexes the optical signals, transmitted along the transmission paths, and outputs to the selectors.

12. An optical communication system comprising:
a transmitter which generates laser light oscillated simultaneously at a plurality of wavelengths by using a laser resonator, in which the statistical distribution of photons in each mode complies with thermal distribution, and the total number of photons of a sum of a plurality of modes is constant, and which generates photons by stimulated emission centering on a plurality of windows, provided on a wavelength axis, the laser resonator comprising:
an optical negative feedback element for keeping the total number of generated photons constant; and a plurality of band pass filters which are connected to the optical negative feedback element and have different transmission center wavelengths, and the laser resonator simultaneously oscillates single peak modes matching the transmission center wavelengths of the band pass filters, and using an optical modulator to add data to the laser light and transmit a signal light;
a transmission path which the signal light, transmitted from the transmitter, is transmitted along; and
a receiver which receives the signal light from the transmission path, and demodulates the data based on an optical signal having wavelength components corresponding to the plurality of windows contained in the signal light.

13. The optical communication system as described in claim 12, wherein the optical communication system comprises a ring network of nodes which are connected in a ring, the node being provided with at least one of the transmitter and the receiver;
the nodes provided with the transmitter transmitting wavelength components, contained in the signal light, to transmission paths provided in opposite directions on the ring network; and
the nodes provided with the receiver extracting all wavelength components which correspond to the plurality of windows set at an identical laser oscillator from the light of wavelength components passing around the ring network, and demodulating the data.

14. The transmitter as described in claim 8, wherein the optical negative feedback element is a semiconductor light amplifier which operates in a gain saturation state.

15. The transmitter as described in claim 8, each of the laser oscillators being a ring resonator which uses an optical fiber, further comprising:

a divider which divides the optical path of the ring resonator into a plurality of branches at a predetermined location, and outputs the divided light to the band pass filters; and a coupler which multiplexes transmitted light from the band pass filters, and couples the multiplexed light to one optical fiber, and each of the laser oscillators simultaneously oscillates laser light in a plurality of different wavelength modes within the ring resonator.

16. The transmitter as described in claim 8, further comprising
a plurality of variable optical attenuators, which are provided at each branch and attenuate light, transmitted along each branch; and
a control circuit which adjusts the variable optical attenuators so as to equalize the optical strengths of transmission center wavelengths of each band pass filter.

17. The optical communication system as described in claim 12, wherein the optical negative feedback element is a semiconductor light amplifier which operates in a gain saturation state.

18. The optical communication system as described in claim 12, the laser resonator being a ring resonator which uses an optical fiber, further comprising:
a divider which divides the optical path of the ring resonator into a plurality of branches at a predetermined location, and outputs the divided light to the band pass filters; and
a coupler which multiplexes transmitted light from the band pass filters, and couples the multiplexed light to one optical fiber, and
the laser resonator simultaneously oscillates laser light in a plurality of different wavelength modes within the ring resonator.

19. The optical communication system as described in claim 12, further comprising
a plurality of variable optical attenuators, which re provided at each branch and attenuate light, transmitted along each branch; and
a control circuit which adjusts the variable optical attenuators so as to equalize the optical strengths of transmission center wavelengths of each band pass filter.

* * * * *